June 27, 1961

D. B. PARKINSON ET AL 2,990,535

SEISMIC EQUIPMENT

Filed Nov. 26, 1956

INVENTORS
DAVID B. PARKINSON
WEBSTER C. ROBERTS
LAMBERT HANER
ALLEN EDWIN LEPLEY

BY *Eber J. Hyde*
ATTORNEY

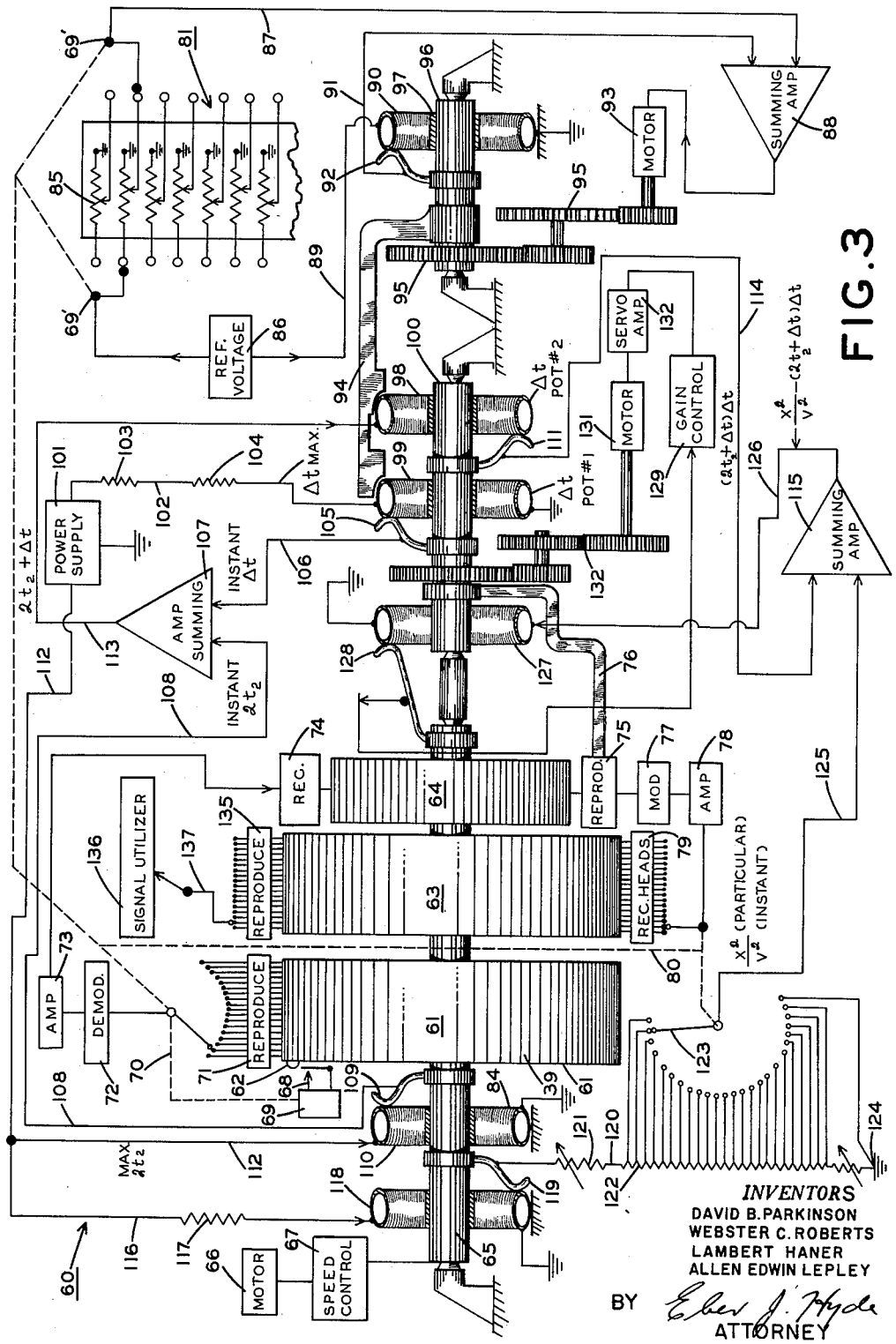

2,990,535
SEISMIC EQUIPMENT

David B. Parkinson, Cleveland Heights, Webster C. Roberts, South Euclid, Lambert Haner, Lakewood, and Allen Edwin Lepley, Maderia, Ohio, assignors to Clevite Corporation, Cleveland, Ohio, a corporation of Ohio Filed Nov. 26, 1956, Ser. No. 624,351
12 Claims. (Cl. 340—15)

This invention pertains to apparatus for seismic prospecting, and more particularly to apparatus for phase adjusting each of the several traces of a seismogram so as to shift each trace, as an entity, with respect to each other trace, and to also phase adjust each trace by a variable expansion or contraction of the trace with respect to the other traces.

This application is related to United States patent application Serial No. 605,912 filed August 6, 1956, in the name of Semi J. Begun and Alfred P. Dank, for Seismic Prospecting Apparatus, which in turn is a continuation-in-part of United States patent application Serial No. 442,064, filed July 8, 1954, in the names of Semi Joseph Begun, Gim P. Chan and Alfred P. Dank, for Multichannel Magnetic Recording, now Patent No. 2,938,115, and of United States patent application Serial No. 465,709, filed October 29, 1954, in the name of Semi Joseph Begun for Multichannel Magnetic Reproducing Apparatus, now Patent No. 2,958,849, assigned to the same assignee as the present application.

In the art of seismographic prospecting a plurality of record traces are recorded side-by-side on a record medium, each trace representing the signal output from a geophone spaced from a shot point. A plurality of the geophones are spaced varying distances away from the shot hole, and as a result of the contour of the earth the phase relationship of the side-by-side traces is not exact.

In order to bring the traces into better phase relationship an imaginary datum plane is drawn, and each of the geophones is, in effect, projected onto that datum plane. The difference in elevation between the geophone and the datum plane produces a phase correction, positive or negative depending upon whether the geophone is to one side or the other of the datum plane, which must enter into the phase correction of the side-by-side traces.

Another factor which results in out of phase adjustment of the plurality of traces is the weathered layer on the earth's surface. This layer is of varying depth and greatly influences the phase relationship of the traces on the record medium since the velocity of sound through the weathered layer is much lower than the velocity of sound through more solid portions of the earth.

When an area is to be surveyed for oil, or other deposits, the operators usually know the depth of the weathered layer either from past experience, or from core drilling. The elevation of each geophone is known, and the elevation of the imaginary datum plane is known. Consequently the phase correction for the projection of each of the geophones onto the datum plane is known, and the correction for the weathering layer is known. With these two bits of information they compute a fixed phase correction for each geophone station which is the sum of the fixed corrections for geophone elevation and for the weathered layer. A charge of dynamite is exploded, preferably at the junction between the weathered and unweathered layers, and seismic reflections are picked up by the several geophones. These reflected vibrations are converted by the geophones into electrical impulses and are recorded substantially side by side on a record member such as a magnetic tape, film or the like displayed as they appeared at each geophone, with respect to time. Thereafter the several traces are reproduced, phase adjusted in accordance with the computed phase correction, and rerecorded on a second record member.

Application Serial No. 605,912 describes and claims the apparatus which phase adjusts the traces to, in effect, project the separate geophones onto the imaginary datum plane. This is known to the seismic prospector as "fixed correction." The apparatus of the present invention applies not only a "fixed correction" but also a "'variable correction" to each geophone trace, and it correlates the times during which "fixed" and "variable' corrections are applied to the geophone traces.

After the geophones are, in effect, projected onto the datum plane, there is presented to the operator what is, to a first approximation, an isosceles triangle, the solution for the altitude of which is of importance. The triangle is formed with the shot hole, projected onto the datum plane, as one base corner. The second base corner is a given geophone projected onto the datum plane, and the apex is the location where a given sound wave originating at the shot reflects off of a given horizontal underground layer back to the given geophone.

In the event the subterranean layers 18, 19, 20 are inclined, the triangle to be solved will not be exactly isosceles, but due to the fact that the layers are usually quite deep compared to the spread of the geophones the error introduced by the tilt is relatively small.

The base of this triangle is known in feet and is the linear distance from the shot hole to the given geophone and to a satisfactory approximation is also known in time units. The two legs of the isosceles triangle are known in time units since they are equal in length, and the total elapsed time is known between the instant of the explosion to the reception of the reflected wave front at a given geophone. Solving this triangle to obtain its altitude, in time units, gives the operator very valuable information on the depth and location of the reflecting layer. The solutions of these many triangles and the application of the solutions to the many geophone traces is the "variable corrections," and appears in the individual traces as a stretching or compressing of the trace.

Considering the fact that perhaps 24 geophones are spread out around the shot point, and that many underground reflecting layers each reflect sound waves to each of the geophones, it is easy to see than in the past, where corrections for each of these numerous triangles were calculated by the operator, the computations involved for each shot was quite large. Then, further considering the fact that several shots were often taken at each hole, and many holes were drilled and shot in order to explore a given locality, it must be realized that the manual effort involved in making any but the roughest corrections were prohibitive.

It is, therefore, an object of the present invention to provide a recording-reproducing device for seismic prospecting which phase adjusts each of the several seismic traces in its entirety to, in effect, project each geophone onto an imaginary datum plane, and to phase adjust each of the several traces to, in effect, solve the numerous triangles formed by the shot point, the plurality of geophones and the plurality of reflecting layers, in terms of time.

A further object of the invention is to provide a recording-reproducing device which will phase adjust a plurality of signals with respect to each other in accordance with two types of phase adjustment; one type moving the entire trace as an entity, the other type stretching or compressing the trace.

Another object of the invention is to provide a device, particularly for seismic prospecting, which quickly, easily and accurately phase adjusts the several traces in accordance with several different types of phase adjustment, and which does so automatically.

Still another object of the present invention is to greatly reduce the computation and time involved at present in computing seismic data.

For a better understanding of the present invention, together with other and further objects thereof, reference is had to the following description taken in connection with the accompanying drawings, and its scope will be pointed out in the appended claims.

An aspect of the invention lies in the provision of an apparatus for phase adjusting a plurality of seismic record traces with respect to each other. This plurality of traces is initially recorded side-by-side on a first strip of record material, either by a drum recorder, tape recorder, disc recorder or the like, and a preferred form of recoding-producing is by the well known magnetic technique. A second strip of record material is driven in synchronism with the first strip; the first strip passing reproducing head means and the second strip passing recording head means which are electrically connected to the reproducing head means. Thus the signal traces on the first strip are rerecorded onto the second strip of record material. Either the reproducing head means or the recording head means, or both, are mounted for movement with respect to the other head means or with respect to each other, the motion being in the direction of the record traces on the record strip. Head moving means are connected to the movably mounted heads and a computer device is connected to the head moving means to compute a given amount of movement and for controlling the head moving means to bring about that computed amount of movement while a given trace is being rerecorded from the first to the second record strip, this action taking place during the "active time" of the equipment. In connection with this aspect of the invention an auxiliary memory drum may be employed onto which one trace at a time of the multichannel record may be recorded and rereproduced, one of the heads associated with the memory drum being moved to bring about the computed amount of correction. Thus, in this concept the terms "recording head means" and "reproducing head means" each may comprise two or more heads, and the term "second record material means" comprises the memory drum as well as the second strip of record material onto which the corrected signals are rerecorded.

Another aspect of the invention lies in the provision of equipment, described immediately above, in combination with further equipment for phase adjusting each trace in its entirety with respect to other traces, this further equipment operating to move the transducer head means with respect to each other during the "dead time" of the equipment; that is, during the time the record strip means are being driven but the traces therein are not being rerecorded from one strip to another. An example of this latter equipment, not in combination with the "active time" phase adjusting equipment is to be found in U.S. patent application Serial No. 605,912, filed August 6, 1956, in the names of Semi J. Begun and Alfred P. Dank, entitled Seismic Prospecting Apparatus. Examples of the transducing head moving means may be found in U.S. patent application Serial No. 442,064, filed July 8, 1954, in the names of Semi J. Begun, Gim P. Chan and Alfred P. Dank, for Multichannel Magnetic Recording, now Patent No. 2,938,115, and in U.S. patent application Serial No. 465,709, filed October 29, 1954, in the name of Semi J. Begun for Multichannel Magnetic Reproducing Apparatus, now Patent No. 2,958,-849; all of these applications being assigned to the same assignee.

With reference to the drawings:

FIGURE 3 is a combination schematic diagram and circuit diagram showing the mechanical and electrical operation of the device.

Figure 1:
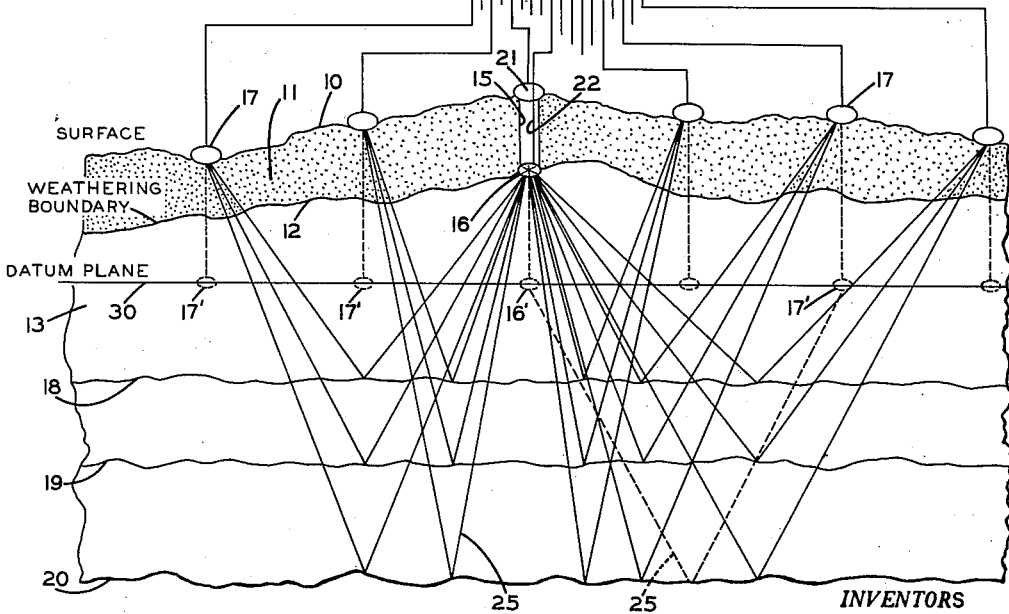
FIGURE 1 is a schematic representation of a seismic recording device and system for making the seismic records.

In FIGURE 1 there is shown a typical section of the earth which is to be explored with seismic equipment. Immediately below the earth's surface 10 there is a layer of somewhat variable depth called the "weathering layer" 11 through which the velocity of sound is about 2000 feet per second, plus or minus; and immediately below the weathering layer 11 the earth is much more solid and dense, the velocity of sound therethrough being on the order of 4000 feet per second and increasing with increased depth and density. The boundary 12 between the weathering layer 11 and the denser part 13 of the earth is usually quite well defined.

Seismic exploration entails drilling a shot hole 15 preferably to the boundary 12 between the weathering layer 11 and the solid earth 13, and exploding a charge of dynamite 16 at the boundary, and sometimes other charges at successively higher points in order to get a succession of seismograms from the same shot hole. A plurality of microphones 17, called geophones, are spread on the earth's surface around the shot hole in a variety of patterns well known to the art. Each of these geophones receives vibratory waves which originate at the explosion point 16, progress to the successively deeper layers 18, 19, 20, and reflect back up to the geophones on the earth's surface. The geophones transduce the vibrations into electrical signals which are recorded on a recorder 20 in the form of a plurality of traces, one for each geophone 17. The subterranean layers 18, 19, 20 reflect the sound according to their different densities or sound transmitting ability, as is known to the art. An "up-hole" geophone 21 is provided near the top of the shot hole 15, and electrical means 22 known to the are are provided for recording the exact instant of the explosion of the dynamite.

It will be seen that a large number of angular paths 25 are formed by the sound waves traveling from the shot point 16 down to the successively deeper layers 18, 19, 20 and there reflected back up to the several geophones 17. Quite often twenty-four geophones are simultaneously used on the surface of the earth, resulting in twenty-four separate side-by-side traces on the record device 20, plus several traces for the "up-hole" geophone 21, the "time break" device 22 and other timing traces which may be known to the art. Each of these angular paths 25 together with the horizontal distance along the earth's surface between the shot hole and a given geophone which receives the reflected wave forms a triangle. This triangle is capable of approximate solution to determine its altitude if the ground is flat and if the depth of the weathering layer is known, but as a practical matter the seismic art prefers to draw an imaginary datum plane 30, and to project the several geophones 17 and the shot point 16 onto this datum plane 30. This plane can be above or below the earth's surface, or it may intersect the earth's surface. With the several geophones and the shot point projected onto the datum plane, whose elevation with respect thereto is known, the solution of the triangle 25 becomes somewhat more simple as the triangle 25 is an isosceles triangles whose base, measured in feet, is the distance from the shot hole along the datum plane to the geophone at the other base angle of the triangle, and the two legs of the triangle, measured in time units, is known from the elapsed length of time for the sound to travel from the shot point 16 to the reflecting layer and back to the geophone. Such a triangle is shown in FIGURE 2.

Figure 2:
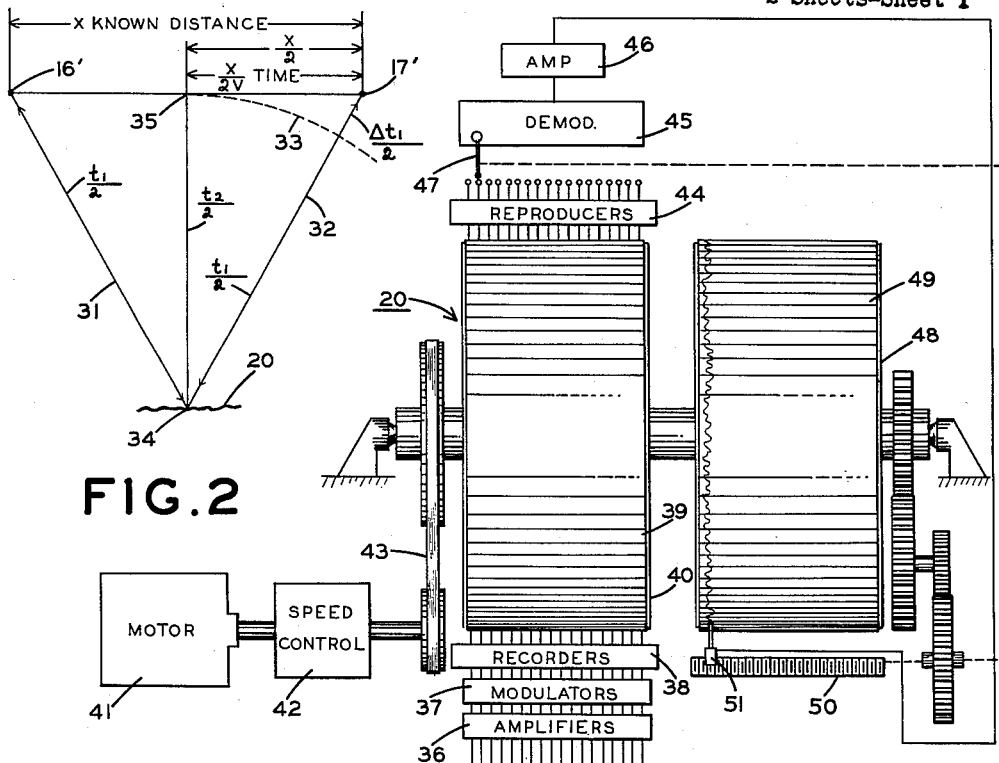
FIGURE 2 shows the triangle which must be solved in order to obtain valuable seismic data.

The automatic phase shifting equipment which is shown, described and claimed in the previously mentioned application Serial No. 605,912 operates, in effect, to reduce the seismic computation to the solution of the triangle shown in FIGURE 2, and the present invention in addition to reducing the computation to the solution of the triangle shown in FIGURE 2 automatically solves the triangle.

With reference to FIGURE 2, the distance X, in fact, is known. It is the distance along the ground from the shot hole 15 to the geophone 17 if the ground is reasonably level, and if it is not reasonably level the actual distance can readily be computed. If $t_1$ is the elapsed time for the sound wave to travel from the shot point to the reflecting layer 20 and back to the geophone position 17' (corrected for weathering layer thickness and for elevation of shot hole and geophone 17 above or below datum plane), then each leg 31, 32 of the isosceles triangle is represented by $$\frac{t_1}{2}$$

Line 33 is an arc struck with point 34 as the center and the vertical distance to the line 16'—17' as the radius; the increment above the arc 33 along line $$\frac{t_1}{2}$$

being called $$\Delta\frac{t_1}{2}$$

If the distance $$\frac{X}{2}$$

measured in feet, is divided by the velocity V or sound through the medium, the short leg of the right angle triangle 34, 35, 17' may be represented by $$\frac{X}{2V}$$

The triangle is to be solved to find the long leg $$\frac{t_2}{2}$$

in terms of time.
It will be seen that $$\left(\frac{t_1}{2}\right)^2 = \left(\frac{t_2}{2}\right)^2 + \left(\frac{X}{2V}\right)^2$$

$$t_1^2 = t_2^2 + \left(\frac{X}{V}\right)^2$$

$$t_1^2 - t_2^2 = \left(\frac{X}{V}\right)^2$$

$$(t_1 - t_2)(t_1 + t_2) = \left(\frac{X}{V}\right)^2$$

but since $$\frac{t_1}{2} - \frac{t_2}{2} = \frac{\Delta t_1}{2}$$

then $$t_1 - t_2 = \Delta t_1$$

so $$\Delta t_1(t_1 + t_2) = \left(\frac{X}{V}\right)^2$$

but $t_1 = \Delta t_1 + t_2$
and $t_1 + t_2 = \Delta t_1 + 2t_2$
so $$\Delta t_1(\Delta t_1 + 2t_2) = \left(\frac{X}{V}\right)^2$$

or $$\Delta t_1(2t_2 + \Delta t_1) = \left(\frac{X}{V}\right)^2$$

This last equation is solved by the equipment shown in FIGURE 3. The original equation can be solved directly by electrical and mechanical devices but would require more complicated equipment than is necessary to solve this last equation.

The equipment shown in FIGURE 1 is used in the field to obtain a record which may then be sent back to the laboratory for phase adjustment and subsequent study. In this field equipment the electric signals generated by the several geophones 17, the uphole geophone 21, the timing channels and the time break signal are all recorded side-by-side as separate traces on the recording device 20. The signals are amplified by separate amplifiers 36, modulated by separate frequency modulators 37, and fed to separate recording channels 38. Preferably magnetic recording techniques are used, and the head 38 is of the multichannel type, having a separate channel for each trace to be recorded on the moving strip of magnetizable material 39 which is removably mounted around rotating drum 40. The drum 40 is cyclicly rotated at a very uniform rate of speed by motor 41, through a speed lock device 42 and a belt drive system 43.

During one rotation of the drum 40 the entire length of the seismic trace is recorded. It is important that the trace does not occupy the entire circumference of the drum, thereby providing some "dead time" or unrecorded portion on the strip of record material. This "dead time" on the record material is utilized, as will be seen later, to provide a short period of time to permit head adjustment without altering in any way the record trace, except to change its position, or phase, as an entity with respect to other traces. As an example, if it is desired to record a 5 second seismic trace the time period of the rotation of the drum may be 6 seconds. The one second interval is used to effect the "fixed" correction by positioning one of the transducer heads as will later be more fully explained, and during the subsequent 5 second interval the "variable" correction is applied. During the fixed correction interval the seismic record is not transduced, but during the variable correction period the transducer head is physically moved thereby stretching or compressing the trace.

In order for the operator to quickly check the success of the field record 39 a visual rerecording device comprising a pen recorder 51 is provided. For details of this equipment reference may be had to U. S. patent application S.N. 402,388, filed January 5, 1954, in the names of Semi J. Begun, Everett R. Sarratt, John F. Blaha and Dean R. Christian, entitled, Recording Method and Apparatus, now Patent No. 2,803,515.

Briefly, the record on the tape 39 is repeatedly rotated, and one channel at a time is sequentially reproduced through reproducing heads 44, demodulators 45 and amplifiers 46 to the pen recorder 51, causing it to draw a visible trace on the paper 49. For economy's sake the reproducing head 44 may be a multichannel head and there need be only one demodulator and amplifier, a step switch 47 being provided to automatically and sequentially connect successive channels of the head 44 to the output circuit, the operation of the switch 47 being in synchronism with the rotation of the drum 48 on which the paper 49 is replaceably mounted. A lead screw 50 is provided for continuous or for step-by-step advancement of the pen 51 across the paper in synchronism with the rotation of drum 48.

If the shot was successful and the strip 39 contains a good record, the strip 39 is removed from drum 40 and sent back to the laboratory where it is mounted on the equipment 60 shown in FIGURE 3. It is to be understood, however, that the field equipment could include all of the elements of the laboratory device shown in FIGURE 3, and that it is not essential for the original recording equipment 20 to be separate from the laboratory equipment 60.

The magnetic record strip 39 is mounted on drum 61 of the laboratory equipment 60, shown in FIGURE 3, with the time break signal in known relation to the position of the drum 61. Thus, the time break signal occupies such a position with respect to the synchronizing projection 62, whose function is later explained, that the "dead" time on the tape passes the reproducing heads while head means somewhere in the system are being moved, in effect, to displace the successive traces with respect to each other for phase adjustment in accordance with a fixed correction for geophone elevation and weathering layer depth.

The equipment shown in FIGURE 3 performs this fixed phase adjustment, one trace at a time, in the following manner:

The reproducing drum 61, a companion recording drum 63 and a transfer drum 64 are all mounted on a common drive shaft 65 which is driven at a constant, carefully controlled rate of speed by motor 66 through a speed control device 67. Drums 63 and 64 carry strips of magnetizable material, the strips on drums 61 and 63 being easily replaceable, and the strip on drum 64 being semi-permanently installed. As the drums are rotated the timing projection 62, once each cycle, closes switch 68 thereby activating a stepping switch mechanism 69, causing a plurality of stepping switch operations to take place simultaneously, as shown by the dotted line 70. The switch mechanism 69 may be Model No. RVF, rotary 30 position switch sold by North Electric Company of Galion, Ohio.

Reproducing head means 71, preferably of the multichannel type, are positioned adjacent the tape 39 on drum 61, and it has one channel for each channel of information on the tape 39. The stepping switch 69 connectn the proper channel of head 71, for example channel 2, through the demodulator 72 and the amplifier 73 to the single channel record head 74 mounted in fixed transducing relationship to the rotating drum 64. The given record trace reproduced from the field tape 39 mounted on drum 61 is accordingly rerecorded in its original condition and position on drum 64. A reproducing head 75, preferably of the flux sensitive type, is movably mounted on arm 76 for motion around drum 64 in the direction of the trace recorded thereon and with respect to the recording head 74. A flux head is used for reproducing the recorded signal because in seismic prospecting low frequency signals in the frequency band of from about 5 to about 500 cycles per second are of importance, and, as is known, a flux responsive head is well suited for the linear reproduction of the low frequency signals at varying speeds of medium. The output of the flux head 75 is amplified by amplifier 78, frequency modulated by modulator 77, and is recorded on the record strip on drum 63 by means of multichannel recording head 79. Stepping switch 69 is connected to the recording head 79 by line 80 so that as channel 2 of reproduce head 71 is connected into the above described circuit, channel 2 of recording head 79 is likewise connected into the circuit, as shown.

Due to angular positioning of the reproducing head 75 around drum 64 during the one second "dead" period prior to its reproducing a given seismic trace from drum 64 the signal recorded on drum 63 is shifted in its entirety with respect to its original position on drum 61, the amount of this shift being calculated by the operator for each trace and set on a potentiometer device 81 which controls a servo system to be described. In addition to the computed shifts which are introduced by the servo system, there is a shift between the trace locations on drums 61 and 63 due to the approximately 180 degree displacement between the recording head 74 and the reproducing head 75. Correction for this is achieved by displacement of the starting points with respect to the tape joints to keep the recorded traces from overlapping the tape joints. Each of the plurality of seismic traces originally recorded on tape 39 is sequentially phase shifted, in its entirety, with respect to the other traces, and the potentiometer device 81 contains enough separate adjustable potentiometers acting in sequence under the control of stepping switch 69 and through a servo system to automatically and sequentially rerecord each of the seismic traces from drum 61 through intermediate drum 64 and onto drum 63. If there are 24 seismic traces plus four timing or information channels, a total of 28 revolutions of the drum system is necessary for complete transfer. If one revolution takes 6 seconds a total of only 168 seconds is necessary to phase shift all of the seismic traces and to rerecord the timing and information channels onto a new record strip on drum 63. Automatic erasing means (not shown) may be associated with drum 64 and located between the reproducing head 75 and the recording head 74 in the direction of rotation of the drum, in order to prepare the drum 64 for a new magnetic record during the next cycle.

Arm 76 moves the reproducing head 75 in accordance with two values of phase shift for each seismic trace which is rerecorded, it being understood that the system goes through the same motions for each of the several traces but applies different values of phase shift. The first motion takes place during the "dead" time of a cycle, that is, during that portion of a complete rotation of the drum 64 past the pickup head 75 when no signal is being reproduced. The amount of motion during the "dead" time is derived from the potentiometer 81, but the value of it must be computed in advance by the operator and hand adjusted on the potentiometer. A seismic trace around the drum 64 occupies, for example, only ⅚ of its circumference if a 5 second trace is recorded. Thus ⅙ of the time of one rotation is "dead" time during which no signal is being transduced, but during which the head moves to effect fixed correction, and ⅚ is "active" time during which the arm 76 continuously moves the head 75 in accordance with the second phase shift which is computed by the equipment. The first phase shift, in effect, merely picks up each successive trace and moves it as an entity without stretching or compressing it, and the second phase shift, taking place as it does during the actual rerecording process, stretches or compresses the trace.

Thus each cycle of operation of the system commences with reproducing head 75 moving a small amount within the "dead" or non-reproducing time period to phase adjust the rerecorded signal by a fixed amount, then as the signal to be reproduced begins to pass the reproducing head a computer circuit continuously solves a series of the triangles shown in FIGURE 2, and continuously moves head 75 in accordance with the solution, the head 75 moving throughout the reproduction of the trace to stretch or compress the rerecorded trace. Reproducing head 75 is moved to provide the "active" phase adjustment the instant the trace on drum 64 starts past it because of a very accurate alignment of the tape 39 on drum 61 with respect to the zero, or no signal, point on potentiometer 84 about which more is described at a later point herein. Reasonably accurate alignment of tape 39 with respect to the cyclic switching device 68, and very accurate alignment of the tape 39 with respect to the zero point on potentiometer 84 establishes all of the relationships which are necessary for the successful rerecording of the phase shifted traces.

Potentiometer 81 has a plurality of adjustable potentiometers 85, one for each of the seismic traces to be phase adjusted. The value of each potentiometer is manually adjustable by a calculated amount, as has been mentioned. Each potentiometer 85 is connected into a servo circuit by switch mechanism 69', and a source 86 of reference voltage is also connected to the proper potentiometer 85 at the proper time, also by the step switch 69'. The potentiometer 85 which is connected into the servo circuit applies an output voltage through line 87 to the summing amplifier 88, and simultaneously through line 89, potentiometer 90 and line 91, a voltage is applied to the summing amplifier 88 from the reference source 86. The voltage from potentiometer 85, applied to amplifier 88, has a value representative of the particular value of a millisecond correction, the voltage applied by the reference source 86 to the potentiometer 90 is representative of the maximum millisecond correction; and the portion of the maximum selected in accordance with the position of potentiometer arm 92 with respect to the potentiometer 90 is the instantaneous correction to be applied. The values of these two applied voltages should be the same, in which event there is no output from amplifier 88. However, when there is a difference in the two voltages it is applied to servo motor 93 thereby rotating the arm 94 through gears 95, and also rotating potentiometer arm 92 with respect to potentiometer 90 which floats on the shaft 96, the bearing 97 connecting potentiometer 90 to the shaft 96 for relative rotation with respect thereto. The new position of contact arm 92 on potentiometer 90 applies a different voltage to amplifier 88 until a balance is reached and the system stops, in accordance with known servo system techniques.. Potentiometers 98 and 99 are connected to the movable arm 94 and rotate with it under control of the servo system just described. Both of the potentiometers 98, 99 rotate with respect to the shaft 100 on which they are mounted.

Potentiometers 98 and 99 are the $\Delta t$ potentiometers used in the solution of the previously described equation, and moving them with respect to their wipers 111 and 105 applies a value to the triangle solving portion of the equipment which moves the reproduce head. In addition to the afore-described fixed correction there is also the variable correction which is applied to the head throughout the trace reproduction.

A power supply 101 is connected through line 102 and resistors 103, 104 to the potentiometer 99 applying a voltage $\Delta t$ maximum to the potentiometer, and a portion of that voltage is selected by contact arm 105 mounted to rotate with shaft 100. The portion selected by arm 105 is the instantaneous $\Delta t$ and is connected through line 106 to summing amplifier 107. Also supplied to the input of amplifier 107 by line 108 is a particular voltage $2t_2$ derived from contact arm 109 of potentiometer 110. The arm 109 rotates on shaft 65 along with drums 61, 63, 64, and the potentiometer case 110 is stationary and has applied to it a voltage equal to the maximum value of $2t_2$, obtained from power supply 101 through line 112.

Amplifier 107 adds the two inputs 106 and 108, delivering a voltage to line 113 which is representative of the instantaneous value of $2t_2+\Delta t$ which is applied to the case of potentiometer 98. Wiper arm 111 of potentiometer 98 is secured to shaft 100 and rotates with it. The voltage it picks off is representative of $(2t_2+\Delta t)\Delta t$, and it supplies this voltage through line 114 to summing amplifier 115.

Voltage from power supply 101, through lines 112, and 116 and through resistor 117, is applied to the potentiometer 118. The voltage applied to it represents maximum $$\frac{X^2}{V^2}$$

or $$\frac{\text{maximum } X^2}{\text{minimum } V^2}$$

and its wiper 119 which rotates with the drum shaft 65 picks off a fraction of the voltage proportional to the angle of the drums 61, 63, 64 and equal to $$\frac{\text{minimum } V^2}{\text{instantaneous } V^2}$$

Thus the output voltage from wiper arm 119 represents $$\frac{\text{maximum } X^2}{\text{instantaneous } V^2}$$

or for a geophone spread of say 6000' represents $$\frac{6000'}{\text{instantaneous } V^2}$$

A variable resistor 121 is in line 120 connected to the wiper arm 119, and a series of selected taps is provided on resistor 122. Each of these taps select a fraction of the maximum voltage equal to a particular $$\frac{X^2}{\text{max. } X^2}$$

This corresponds to the spacing of the geophones spread across the surface of the earth for the given shot which has been recorded. A stepper switch 123 driven as a portion of switch 69, selects the proper tap so that the system automatically solves the entire sequence of triangles for the entire geophone spread. Point 124 represents $X=0$, or the shot point. Line 125, connected to the switch arm 123, has a voltage representative of a $$\frac{\text{particular } X^2}{\text{instantaneous } V^2}$$

and this voltage is applied to the summing amplifier 115. Out of amplifier 115 there is a voltage on line 126 which represents $$\frac{X^2}{V^2}-(2t+\Delta t)\Delta t$$

and this is applied to the potentiometer case 127 which is mounted to rotate with shaft 100. The wiper 128 for potentiometer case 127 is mounted on shaft 65 and rotates with the drums 61, 63, 64, picking off a voltage and applying it to the gain control device 129, and thereafter to the servo amplifier 132 and servo motor 131. Motor 131 rotates the shaft 100 through gears 132, thereby rotating potentiometer arms 105 and 111 and also the potentiometer case 127. Also, rotation of shaft 100 moves the flux head 75 around the drum 64, thereby continuously phase adjusting the seismic signal being reproduced by flux head 75 in accordance with the instantaneous value of the equation $$\left(\frac{X}{V}\right)^2-(2t+\Delta t)\Delta t$$

It will be seen that this seismic system entails two servo mechanisms in series; the first servo mechanism operates to move the case of a potentiometer which is a portion of the second servo mechanism, and the second servo mechanism then operates around a new position. Effectively the first system offsets each trace by a fixed amount to compensate for weathering layer thickness and geophone elevation, and the system also expands or contracts each trace in accordance with a continuous solution of the triangle to find $t_2$. The timing in the system and the location of record strip 39 on drum 61 is such that while the flux head 75 is reproducing a given seismic trace the motion of head 75 is due solely to the triangle solution. Consequently it may be said that motion of head 75 due to "fixed" correction takes place prior to the actual reproduction of a trace, and motion of the head 75 due to "variable" correction takes place during the reproduction of a seismic trace.

The output signal from reproducing head 75 is again frequency modulated at 77, amplified at 78 and rerecorded on tape drum 63 by recording head means 79, as has been explained.

Tape drum 63, after all traces have been rerecorded onto it, then contains the plurality of side-by-side seismic traces phase adjusted for weathering layer depth and geophone elevation above datum, and phase adjusted to compensate for the various angles 25'. A multichannel output head 135 is connected through demodulating means (not shown) to a signal utilizing device 136, which may be another phase adjusting device, a signal compositing device or other signal utilizing device known to the art. A switch mechanism 137 may be provided for reproducing the channels of head 135 sequentially through the demodulator to the utilizing device, or all channels may be reproduced simultaneously through demodulators to the utilizing device, as is known to the art.

The movable reproducing head 75 is a "flux" head, and it operates to reproduce an unmodulated signal from the memory drum 64, the original modulated signal having been demodulated by demodulator 72 after reproduction by head 71 associated with drum 61. For extremely good signal-to-noise ratio and for minimum error in the phase relationship of the several signal channels it is essential that a flux head be used and that it operate on an unmodulated signal. With this combination a signal-to-noise ratio of 52–54 db is achieved and an error not exceeding 2 miliseconds between the original record on drum 61 and the final record on drum 63. Without the combination of the flux head operating on an unmodulated signal the signal-to-noise ratio would not be over 40 db, and the error between the two records would be at least 4 miliseconds.

The reasons for the outstanding performance of the flux head operating on an unmodulated signal is derived from the following facts:

Assume a direct recording (not modulated) on the correction drum 64, and assume playback with a "velocity" head (not a flux head). There will be a severe loss of signal output at low frequencies in accordance with the well-known frequency vs. output curve for a "velocity" head. This loss can be compensated electronically as is known in the art, but this electronic compensation introduces phase shifts which is highly undesirable, especially in seismic work where the phase relationship of the several signal channels is of extreme importance to the interpretation of the data. A flux head reproducing the direct recording is flat from some high frequency signal right down to zero, or so close to zero as to be unimportant. Consequently there is no phase shift in the signal. With a "velocity" head when the reproduced signal is due to the rate of change of flux in the head, reproduction of a signal with a head which is moving in order to make the "variable" correction greatly effects the amplitude of the signal, especially at higher frequencies. This introduces amplitude distortion in the reproduced signal, and there will be a constant loss of low frequency amplitudes which is serious since the seismic art is mostly interested in relatively low frequency signals. The low frequency loss can be compensated, as mentioned, but the compensation introduces phase shift. If the record head associated with the correction drum is moved in order to introduce variable correction into a directly recorded signal, no recorded amplitude error is introduced due to variable relative speed between head and record member. However, on playback there is still a severe low frequency fall off of signal which is undesirable, and which can be compensated electronically only with the introduction of highly undesirable phase shift in the signal.

Assume a modulated signal on the record drum 61. At the present time the field equipment which records the record applied to drum 61 is of the frequency modulating type because signal-to-noise ratios on the order of 52–54 db are obtainable by using fixed transducer heads and high inertia drums. If the FM signal is carried directly to the correction drum 64 without demodulating, and if the recording head is moved to introduce the desired correction, the signal-to-noise ratio is degraded to 35–40 db due to "jitters" or irregular movement of the head. Servo systems are just not smooth enough to prevent this extremely undesirable degradation of the signal. The system of the present invention utilizes a frequency modulated signal on drum 61, demodulates the reproduced signal by demodulator 70, records the demodulated signal using a fixed recording head 74 in association with the correction drum 64, and uses a movable "flux" head 75 to introduce corrections while reproducing the signal from drum 64. The corrected signal may then be remodulated if desired, or if the final intelligence is desired in an unmodulated condition the modulator 77 is not essential. Thus, the claimed system does not introduce severe amplitude distortion, nor does it introduce severe phase shift in the signals.

While there have been described what are at present considered to be the preferred embodiments of the invention, it will be obvious to those skilled in the art that various changes and modifications may be made therein without departing from the invention and it is, therefore, aimed to cover all such modifications and changes as fall within the true spirit and scope of the invention.

We claim:

1. In apparatus for phase adjusting a plurality of seismic record traces with respect to each other in accordance with given amounts of phase adjustment, said plurality of traces being initially recorded side-by-side on a first multichannel strip of record material; a second multichannel strip of record material; a single channel strip of record material, means driving all three strips of material cyclically in synchronism; first reproducing head means for reproducing the pre-recorded traces, one at a time, from said first strip of record material; first recording head means connected to said first reproducing head means and associated with said single channel strip of record material for rerecording the reproduced signal thereon; second reproducing head means associated with said single channel strip of record material for reproducing the record therefrom; second recording head means connected to said second reproducing head means and associated with said second multichannel strip of record material for rerecording thereon the signal reproduced from said single channel strip of record material; means movably mounting one of the head means associated with said single channel strip of record material for movement in the direction of said record trace thereon with respect to said other head means associated with said single channel strip of record material; head moving means connected to said movably mounted transducer head means; electronic means connected to said head moving means for computing a given amount of head movement and for controlling the head moving means to effect said given amount of head movement to produce a given amount of phase adjustment in said signal while rerecording the trace from said first to said second multichannel strip of record material; and step switch means connected to said first reproducing head means and to said second recording head means for sequentially reproducing and rerecording the several seismic traces from the first to the second multichannel record strip with the varying degrees of phase adjustment.

2. Apparatus as set forth in claim 1, in which two different types of phase adjustment are applied to the seismic record traces, the time period of the cyclic motion of said strip of record material being greater than the time period of said original record traces to establish a dead time period for each trace when no transducing signal transfer is being effected, adjustable means connected to said head moving means for moving said head a given amount, synchronizing means operated in synchronization with the motion of said record strips to cause said head moving means to move said head means a given amount only during said dead time; said computer means moving said head means during said active time period.

3. In apparatus for phase adjusting a plurality of seismic record traces with respect to each other, said plurality of traces being initially magnetically recorded side-by-side on a first strip of magnetic record material as frequency modulated magnetic traces; a second multichannel strip of magnetic record material; a single channel strip of magnetic record material; means driving all three strips of material cyclically in synchronism; first magnetic reproducing head means for reproducing the pre-recorded traces, one at a time from said first strip of record material; means for demodulating said reproduced signals; first magnetic recording head means connected to the output of said demodulator means and associated with said single channel strip of record material for re-recording thereon the demodulated reproduced signal; second reproducing head means of the flux sensitive type associated with said single channel strip of record material for reproducing the record therefrom; second recording head means and associated with said second multichannel strip of record material; means in said connection between said flux sensitive reproducing head means and said second recording head means for frequency modulating said signal prior to rerecording it on said second multichannel strip of record material; means movably mounting said flux sensitive reproducing head means for movement in the direction of said record trace on said single strip of record material and for movement with respect to said recording head means associated therewith; head moving means connected to said movably mounted flux head means; electronic means connected to said head moving means for computing a given amount of head movement and for controlling the head moving means to effect said given amount of movement to produce a given amount of phase adjustment in said signal while recording the trace from the first to the second multichannel strip of magnetic record material; and switch means connected to said first reproducing head means and to said second recording head means for sequentially reproducing and rerecording the several seismic traces from the first to the second multichannel record strip with varying degrees of phase adjustment.

4. Apparatus for phase adjusting a plurality of seismic traces as set forth in claim 3, further characterized by said computer continuously computing the amount of phase adjustment and causing said reproducing head to continuously move during the reproduction of a given seismic trace.

5. Apparatus for phase adjusting a plurality of seismic traces as set forth in claim 4, further characterized by fixed adjustment means connected to said movable reproducing head for moving said head a fixed amount prior to said head reproducing a given seismic trace.

6. Apparatus for phase adjusting a plurality of seismic traces as set forth in claim 5, further characterized by a servo mechanism for moving said reproducing head, said computer and said fixed adjustment means operating through said servo mechanism to move said reproducing head means.

7. In apparatus for phase adjusting a plurality of seismic record traces with respect to each other, said plurality of traces being initially magnetically recorded side-by-side on a first strip of magnetic record material as frequency modulated magnetic traces; an immovable multichannel magnetic reproducer head for reproducing the traces from said first record strip; means for demodulating the reproduced signals, a second strip of record material, means for recording the demodulated signal on said second strip of record material, means for reproducing the recorded signals from said second strip of record material, means for moving one of said heads associated with said second record strip to phase adjust the signal with respect to the original record, means for frequency modulating the reproduced, phase adjusted signal, a third strip of magnetic record material, and recording head means associated therewith and electrically connected to the output of said modulating means for recording on said third strip the frequency modulated signal; said recording head associated with said third strip of record material being immovable; and means for driving said first, second and third record strips past their respective heads in synchronization with each other.

8. In apparatus for phase adjusting a plurality of seismic record traces with respect to each other in accordance with given amounts of phase adjustment, said plurality of traces being initially magnetically recorded side-by-side on a first strip of magnetic record material by a modulation system; a second multichannel strip of magnetic record material; a third strip of magnetic record material; means driving all three strips of material cyclically in synchronism; first magnetic reproducing head means associated with said first strip of record material for reproducing the pre-recorded traces therefrom; demodulating means connected to said first reproducing head means for demodulating the signal reproduced; first magnetic recording head means connected to said demodulating means and associated with said third strip of record material for rerecording the demodulated reproduced signals thereon; second magnetic reproducing head means of the flux sensitive type associated with said third strip of record material for reproducing the record signals therefrom; modulator means connected to said flux sensitive second reproducing head means for modulating the output signal from said flux head means; second magnetic recording head means connected to the output of said modulator means and associated with said second strip of record material for recording side-by-side thereon a plurality of traces as modulated signals; means movably mounting said flux sensitive second magnetic reproducing head means for movement in the direction of said record trace on said third strip of record material; head moving means connected to said flux sensitive head means; electronic means connected to said head moving means for computing a given amount of head movement and for controlling the head moving means to effect said given amount of head movement to produce a given amount of phase adjustment in the signals recorded on said second strip of record material.

9. In apparatus for phase adjusting a plurality of seismic record traces with respect to each other in accordance with given amounts of phase adjustment, said plurality of traces being initially magnetically recorded side-by-side on a first strip of magnetic record material; a second multichannel strip of magnetic record material; a third strip of magnetic record material; means driving all three strips of material cyclically in synchromism; first magnetic reproducing head means associated with said first strip of record material for reproducing the pre-recorded traces therefrom; first magnetic recording head means connected to said first reproducing head means and associated with said third strip of record material for rerecording the reproduced signals thereon; second magnetic reproducing head means of the flux sensitive type associated with said third strip of record material for reproducing the record signals therefrom; second magnetic recording head means connected to the output of said flux sensitive reproducing head means and associated with said second strip of record material for recording side-by-side thereon a plurality of traces; means movably mounting said flux sensitive second magnetic reproducing head means for movement in the direction of said record trace on said third strip of record material; head moving means connected to said flux sensitive head means; electronic means connected to said head moving means for computing a given amount of head movement and for controlling the head moving means to effect said given amount of head movement to produce a given amount of phase adjustment in the signals recorded on said second strip of record material.

10. In apparatus for phase adjusting a plurality of seismic record traces with respect to each other in accordance with given amounts of phase adjustment, said plurality of traces being initially recorded side-by-side on a first multichannel strip of the record material in the form of a frequency modulated carrier; a second multichannel strip of record material; a transfer strip of record material, means driving all three strips of material cyclically in synchromism; first reproducing head means for reproducing the pre-recorded traces sequently from said first strip of record material; demodulator means connected to said first reproducing head means for demodulating said frequency modulated carrier; first recording head means connected to said demodulator means and associated with said transfer strip of record material for rerecording the reproduced signal thereon; second reproducing head means associated with said transfer strip of record material for reproducing the record therefrom, said second reproducing head means being a flux head; second recording head means connected to said second reproducing head means and associated with said second multichannel strip of record material for rerecording thereon the signal reproduced from said transfer strip of record material; means movably mounting said flux head means associated with said transfer strip of record material for movement in the direction of said record trace thereon with respect to said other head means associated with said transfer strip of record material; head moving means connected to said movably mounted transducer head means; computer means connected to said head moving means for computing a given amount of head movement and for controlling the head moving means to effect said given amount of head movement to produce a given amount of phase adjustment in said signal while rerecording the trace from said first to said second multichannel strip of record material; and switch means connected to said first reproducing head means and to said second recording head means for sequentially reproducing and rerecording the several seismic traces from the first to the second multichannel record strip with the varying degrees of phase adjustment.

11. Apparatus for phase adjusting a plurality of record traces with respect to each other in accordance with given amounts of phase adjustment, said plurality of traces being initially recorded side-by-side on a first multichannel strip of record material in the form of a signal modulated carrier; a second multichannel strip of record material; a transfer strip of record material; means driving all three strips of material cyclically in synchronism; first reproducing head means for reproducing the pre-recorded traces sequentially from said first strip of record material; demodulator means connected to said first reproducing head means for demodulating the reproduced signals; first recording head means connected to said demodulator means and associated with said transfer strip of record material for recording the demodulated reproduced signal thereon; second reproducing head means of the flux head type associated with said transfer strip of record material for reproducing the record therefrom; second recording head means connected to said second reproducing head means and associated with said second multichannel strip of record material for rerecording thereon the signal reproduced from said transfer strip of record material; means movably mounting said flux head means associated with said transfer strip of record material for movement in the direction of said record trace thereon with respect to said other head means associated with said transfer strip of record material; head moving means connected to said movably mounted head means; computer means connected to said head moving means for computing a given amount of head movement and for controlling the head moving means to effect said given amount of head movement to produce a given amount of phase adjustment in said signal while rerecording each trace from said first to said second multichannel strip of record material; and switch means connected to said first reproducing head means and operating in synchronism with the motion of said record strips for causing the several traces to be reproduced and rerecorded sequentially.

12. Apparatus as set forth in claim 11, further characterized by said traces on said initially recorded strip being frequency modulated, and by said demodulator being a frequency demodulator.

References Cited in the file of this patent

UNITED STATES PATENTS

| | | |
|---|---|---|
| 2,243,730 | Ellis | May 27, 1941 |
| 2,429,236 | Potter | Oct. 21, 1947 |
| 2,440,971 | Palmer | May 4, 1948 |
| 2,604,955 | Hawkins | July 29, 1952 |
| 2,620,890 | Lee et al. | Dec. 9, 1952 |
| 2,732,025 | Lee | Jan. 24, 1956 |
| 2,800,639 | Lee | July 23, 1957 |
| 2,802,201 | Casagrande | Aug. 6, 1957 |
| 2,803,515 | Begun et al. | Aug. 20, 1957 |
| 2,825,885 | Reynolds | Mar. 4, 1958 |
| 2,876,428 | Skelton | Mar. 3, 1959 |

OTHER REFERENCES

Electronics, Begun, January 1955, pp. 152–155.

UNITED STATES PATENT OFFICE
CERTIFICATE OF CORRECTION

Patent No. 2,990,535                                 June 27, 1961

David B. Parkinson et al.

It is hereby certified that error appears in the above numbered patent requiring correction and that the said Letters Patent should read as corrected below.

Column 2, line 21, after "shot" insert -- point --; line 44, for "than" read -- that --; column 3, lines 16 and 17, for "recoding-producing" read -- recording-reproducing --; column 4, line 36, for "are", first occurrence, read -- art --; line 62, for "triangles" read -- triangle --; column 5, line 30, for "or" read -- of --; column 7, line 48, strike out "the" and insert the same after "of", first occurrence, in line 49, same column 7; column 9, line 72, for "ontput" read -- output --; column 12, line 44, column 13, line 24, and column 14, lines 31 and 62, after "electronic", each occurrence, insert -- computer --.

Signed and sealed this 9th day of January 1962.

(SEAL)
Attest:

ERNEST W. SWIDER                                    DAVID L. LADD
Attesting Officer                                 Commissioner of Patents

UNITED STATES PATENT OFFICE
CERTIFICATE OF CORRECTION

Patent No. 2,990,535                         June 27, 1961

David B. Parkinson et al.

It is hereby certified that error appears in the above numbered patent requiring correction and that the said Letters Patent should read as corrected below.

Column 2, line 21, after "shot" insert -- point --; line 44, for "than" read -- that --; column 3, lines 16 and 17, for "recoding-producing" read -- recording-reproducing --; column 4, line 36, for "are", first occurrence, read -- art --; line 62, for "triangles" read -- triangle --; column 5, line 30, for "or" read -- of --; column 7, line 48, strike out "the" and insert the same after "of", first occurrence, in line 49, same column 7; column 9, line 72, for "ontput" read -- output --; column 12, line 44, column 13, line 24, and column 14, lines 31 and 62, after "electronic", each occurrence, insert -- computer --.

Signed and sealed this 9th day of January 1962.

(SEAL)
Attest:

ERNEST W. SWIDER                              DAVID L. LADD
Attesting Officer                            Commissioner of Patents